United States Patent [19]

Luvison et al.

[11] 4,100,495
[45] Jul. 11, 1978

[54] ADAPTIVE METHOD OF AND MEANS FOR RECOVERING DIGITAL SIGNALS

[75] Inventors: Angelo Luvison; Giancarlo Pirani, both of Turin, Italy

[73] Assignee: CSELT - Centro Studi e Laboratori Telecomunicazioni, Turin, Italy

[21] Appl. No.: 785,693

[22] Filed: Apr. 7, 1977

Related U.S. Application Data

[63] Continuation-in-part of Ser. No. 745,800, Nov. 29, 1976, abandoned.

[30] Foreign Application Priority Data

Nov. 27, 1975 [IT] Italy .............................. 69922 A/75

[51] Int. Cl.$^2$ ............................................. H04L 25/08
[52] U.S. Cl. ..................................... 325/323; 329/104
[58] Field of Search ................ 325/42, 321, 323, 324; 178/88, 69 R, 69 A; 328/162, 155; 333/18; 329/104; 364/514, 516, 517, 572, 574, 724

[56] References Cited

U.S. PATENT DOCUMENTS

| | | | |
|---|---|---|---|
| 3,971,996 | 7/1976 | Motley et al. ........................ | 328/155 |
| 4,004,226 | 1/1977 | Qureshi et al. ....................... | 333/18 |
| 4,019,149 | 4/1977 | Kustka et al. ....................... | 329/104 |
| 4,035,625 | 7/1977 | Chiu et al. ........................... | 364/514 |

*Primary Examiner*—Benedict V. Safourek
*Attorney, Agent, or Firm*—Karl F. Ross

[57] ABSTRACT

An incoming data stream in the output of a demodulator and its derivative in the output of a differentiator are passed by respective sampling gates to a pair of equalizers operating by recursive filtration. The optimized data pulses issuing from the first equalizer are quantized and, after storage in a shift register, are algebraically combined in a first adder with a reference signal $\hat{x}$ from that equalizer representing the vector sum of weighted data pulses from a succession of N preceding clock cycles; a resulting error signal $e_n$ is delivered to three cumulative multipliers forming part of three feedback loops which supply an optimized phase signal $\hat{\varphi}$ to the demodulator, an optimized timing signal $\hat{\tau}$ to the sampling gates and an optimized gain coefficient $\hat{K}$ to the equalizers. These three multipliers respectively receive the reference signal $\hat{x}$ from the first equalizer, an optimized differential signal $d\hat{x}/d\hat{\tau}$ from the second equalizer and an updating signal $\tilde{z}$ from the first equalizer. A further cumulative multiplier forms part of a fourth feedback loop delivering an optimized channel coefficient $\hat{G}$ to the equalizers, this latter loop including a second adder which synthesizes another error signal $e'$ from the incoming data pulses $z$ and from the complex product $\hat{G}\cdot\hat{x}$ produced by the last-mentioned multiplier. Each feedback loop includes a selective delay circuit effective only during an operating phase, in contrast to an acquisition phase during which the first adder receives a locally generated test signal in lieu of the quantized data pulses.

10 Claims, 2 Drawing Figures

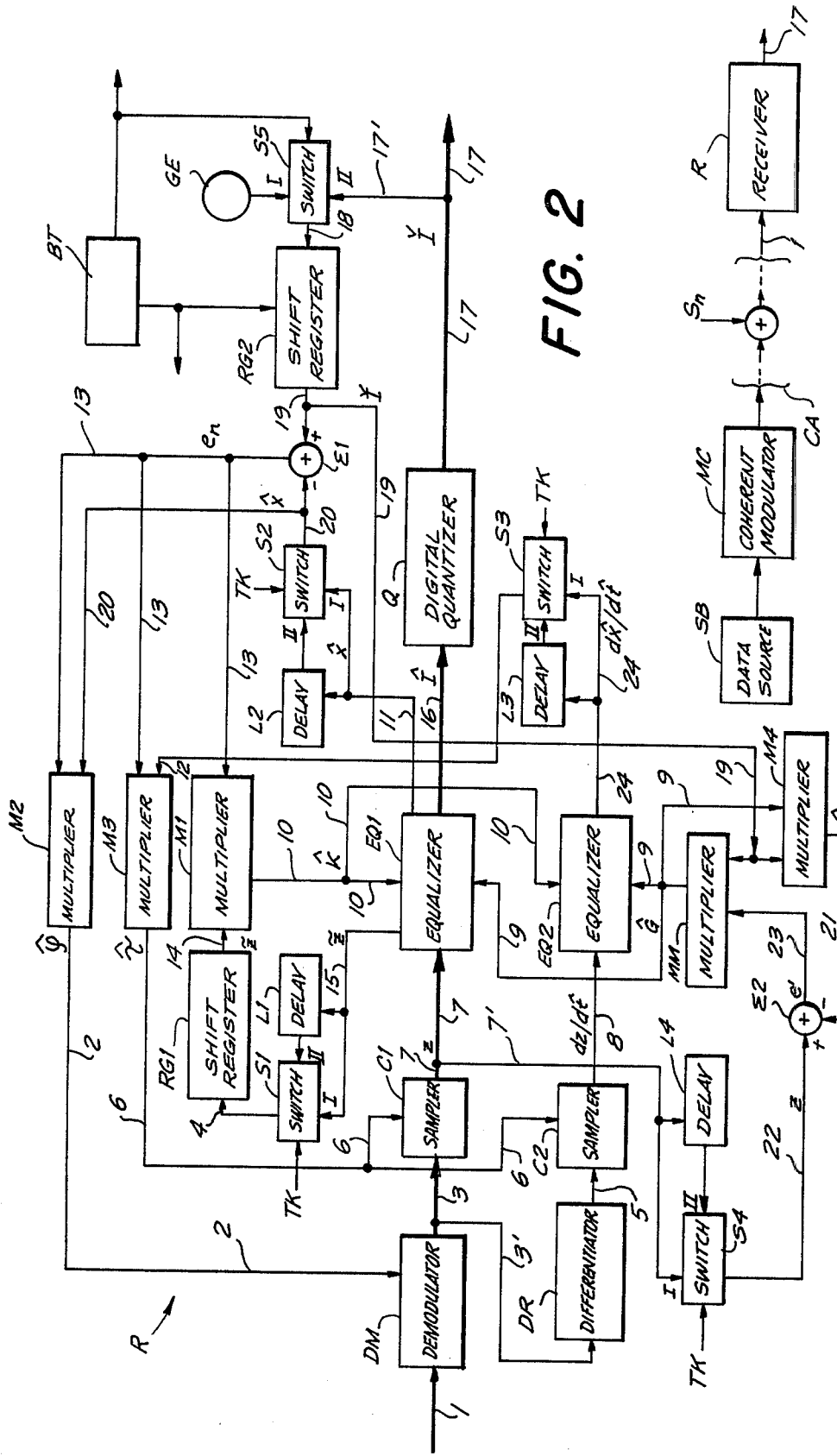

ADAPTIVE METHOD OF AND MEANS FOR RECOVERING DIGITAL SIGNALS

CROSS-REFERENCE TO RELATED APPLICATION

This application is a continuation-in-part of our co-pending application Ser. No. 745,800 filed November 29, 1976, and now abandoned.

FIELD OF THE INVENTION

Our present invention relates to a synchronous adaptive digital receiver for an incoming data flow as well as to a method of operating such a receiver in synchronism with a remote transmitter without the aid of special synchronizing signals.

BACKGROUND OF THE INVENTION

In our commonly assigned prior U.S. Pat. Nos. 3,978,435 and 3,984,789 we have disclosed and claimed an equalizer for optimizing the recovery of data pulses from an incoming message stream. Reference may also be made in this connection to our article entitled "A state-variable approach to the equalization of multilevel digital signals", CSELT Rapporti Tecnici No. 3, April 1974. Such a digital equalizer utilizes the principle of recursive filtration first enunciated by R. E. Kalman in an article entitled "A New Approach to Linear Filtering and Prediction Problems", Journal of Basic Engineering/Transactions of the ASME, March 1960. The algorithm described in our prior patents involves the generation of an updating signal and the weighting of the incoming data pulses by coefficients which are determined by the transmission characteristics of the message channel and which may be initially established in an acquisition phase preceding an operating phase.

Systems are also known for deriving the timing information for the demodulation of an incoming carrier from the data pulses with which this carrier is modulated by phase-shift keying, with utilization of in-phase and quadrature signal components as well as differentiation. Reference may be made in this connection to U.S. Pat. No. 3,634,773 in the name of Hisashi Kobayashi and to an article by that inventor entitled "Simultaneous Adaptive Estimation and Decision Algorithm for Carrier-Modulated Data-Transmission Systems", *IEEE Transactions on Communication* Vol. COM-19, No. 3, pages 268 - 280, June 1971. The Kobayashi system employs adjustable equalizers of the so-called "transverse-filter" type rather than those with recursive filtration described in our prior patents.

With such a transverse filter there is only a single data pulse available in the output of the equalizer during any clock cycle. Since the establishment of synchronism without the transmission of special synchronization signals requires the correlation of data pulses sampled in a multiplicity of consecutive clock cycles, such a system introduces considerable delays which are particularly disadvantageous in the presence of several feedback loops interacting with one another during an acquisition phase, i.e. prior to steady-state operation. Aside from lengthening the acquisition phase, such interaction may also result in instability of the receiver.

OBJECTS OF THE INVENTION

An important object of our present invention is to provide a more efficient method of operating such a data receiver with avoidance of the aforestated drawbacks.

A related object is to provide means in such a receiver for optimizing the various operating parameters used in carrying out the method.

SUMMARY OF THE INVENTION

Pursuant to our present invention, the incoming data flow is periodically sampled under the control of a locally generated timing signal to produce a train of raw data pulses which are then optimized by recursive filtering, in an equalizer operating essentially in the manner described in our above-identified article of April 1974, over a multiplicity of sampling cycles under the control of adaptive parameters including a gain coefficient and a channel coefficient. The optimized data pulses issuing from the equalizer are quantized to form outgoing pulses which can be delivered to a load and, in parallel therewith, are fed during an operating phase to a storage circuit preserving them for an extended period. A reference signal is synthesized within the equalizer from the vector sum of the raw data pulses as weighted by the channel coefficient over a multiplicity of sampling cycles corresponding to the storage period. There is also synthesized within the equalizer an updating signal from the vector sum of the differences between the raw data pulses and the reference signals, again as obtained over a multiplicity of sampling cycles corresponding to the storage period. An error signal, produced by differentially combining the stored data pulses with the reference signal, can be used conjointly with that reference signal for continuously optimizing a phase signal which controls the operation of a demodulator recovering the incoming data flow from a carrier. The error signal is also used, conjointly with the updating signal, for continuously optimizing the gain coefficient of the equalizer. The channel coefficient of the equalizer is continuously optimized under the joint control of the raw and the stored data pulses.

Accoding to another feature of our invention we provide a second equalizer to which the time derivative of the incoming data flow, obtained from a differentiator, is supplied via a sampling gate operating concurrently with a sampling gate which passes the raw data pulses to the first equalizer. The optimized time differential issuing from the second equalizer is used conjointly with the error signal for continuously optimizing a timing signal which controls the two sampling gates.

Thus, our improved receiver comprises several feedback loops for the delivery of optimized control signals to the equalizer or equalizers and to certain upstream components such as a phase demodulator and a sampling gate. In the preferred embodiment described in detail hereinafter, each feedback loop comprises a cumulative multiplier which adds the product of its input signals to the corresponding product stored from the preceding cycle. The feedback loop generating the optimized channel coefficient also includes an ordinary (noncumulative) multiplier which emits the channel coefficient and feeds it to the associated cumulative multiplier, the latter also receiving the stored data pulses to produce a complex product; that product is differentially combined, in a summing circuit within this feedback loop, with the raw data pulses to give rise to another error signal returned to the noncumulative multiplier together with the stored data pulses.

In a system in which a timer controls a switchover from an acquisition or training phase to an operating or tracking phase, the several feedback loops advantageously include selective delay circuits which are effective only during the operating phase in order to compensate for the time during which the data pulses are processed in the equalizer.

BRIEF DESCRIPTION OF THE DRAWING

The above and other features of our invention will now be described in detail with reference to the accompanying drawing in which:

FIG. 1 is an overall block diagram of a communication system including a receiver according to our invention; and FIG. 2 is a detailed diagram of the receiver shown in FIG. 1.

SPECIFIC DESCRIPTION

In FIG. 1 we have shown a source SB of binary data working into a coherent modulator MC whose output in the form of a phase-modulated carrier is fed to a transmission channel CA. As in our prior patents, we have symbolically indicated as part of that channel a summing circuit receiving a signal $S_n$ representative of random noise. At the opposite end of channel CA, a line 1 carries the incoming signals to a receiver R according to our present invention; an output line 17 of that receiver extends to a nonillustrated load.

As shown in FIG. 2, receiver R comprises a pair of equalizers EQ1 and EQ2 of the type disclosed in our prior U.S. Pat. No. 3,984,789. These equalizers are provided with several feedback loops, more fully described hereinafter, whose operation will be better understood from the following theoretical considerations and the algorithms derived therefrom in accordance with our present invention.

Let us consider an incoming signal $z(i)$, with $i$ representing a given instant as measured by sampling cycles which are established by clock pulses CK emitted from a time base BT. This incoming signal can be written as follows:

$$z(i) = G \cdot x(i) + n(i) \tag{1}$$

In the foregoing equation, parameter G is a vector which may be referred to as a channel coefficient and whose components $g_1, g_2, \ldots g_N$ represent the gain factors of certain amplifiers of the equalizer, these gain factors having been correspondingly designated in our aforementioned article. Subscripts $1, 2, \ldots N$ denote respective branch channels over which weighted signal samples, received during the immediately preceding N time slots, are sent to a summing circuit with relative delays causing their simultaneous appearance in the input of that circuit. The variable $x(i)$ is the vector sum of the several signal samples $I(i), I(i), \ldots I(i-N+1)$. Upon optimization by recursive filtration, pursuant to the teachings of our prior patent, these signal samples are designated $\hat{I}(i), \hat{I}(i_1), \ldots \hat{I}(iN+1)$; their vector sum, accordingly, is designated $\hat{x}(i)$ and will be termed a reference signal which may be expressed by $$\hat{x}(i) = F\hat{x}(i-1) + K[z(i) - G \cdot F\hat{x}(i-1)]. \tag{2}$$

In equation (2), function F is a matrix of the form $$F = \begin{vmatrix} 0 & 0 & \ldots & \ldots & 0 \\ 1 & 0 & \ldots & \ldots & 0 \\ 0 & 1 & \ldots & \ldots & 0 \\ \ldots & \ldots & \ldots & \ldots & \ldots \\ 0 & 0 & \ldots & \ldots & 1 & 0 \end{vmatrix}$$

Parameter K in equation (2) is a vector which will be referred to as a gain coefficient and whose components $k_1, k_2, \ldots k_N$ are representative of gain factors designated $K_1(j), K_2(j) \ldots$ in our cited article.

The several feedback loops of receiver R are designed to provide an optimum value $\hat{G}$ of channel coefficient G, an optimum value $\hat{K}$ of gain coefficient K, an optimum value $\hat{\tau}$ for the times $\tau$ at which the incoming signals are sampled, and an optimum value $\hat{\zeta}$ for the phase $\zeta$ of a locally generated sine wave with the aid of which these signals are phase-modulated from their carrier. Thus, as shown in FIG. 2, signal $\hat{\zeta}$ is fed via a lead 2 to a phase demodulator DM connected to incoming line 1, signal $\hat{\tau}$ controls a pair of sampling gates C1, C2 in input leads 7 and 8 of equalizers EQ1 and EQ2, and signals $\hat{G}, \hat{K}$ are delivered in parallel via respective leads 9 and 10 to ancillary inputs of the two equalizers.

Since the optimization of parameters G, K, $\zeta$ and $\tau$ on the basis of signals received in the $i^{th}$ clock cycle affects the next-following cycle, the optimized parameters here of interest have the form $\hat{G}(i+1), \hat{K}(i+1), \hat{\zeta}(i+1)$ and $\hat{\tau}(i+1)$; parameter $\hat{K}(i+1)$ will be resolved into its constituents $\hat{k}_j(i+1)$ where $j$ represents all the integers from 1 through N. These parameters can be represented by the following equations:

$$\hat{G}(i+1) = \hat{G}(i) + \Delta_G(i) e'(i) \cdot x^*(i) \tag{3}$$

$$\hat{k}_j(i+1) = \hat{k}_j(i) + \tag{4}$$

$$+ \Delta_K(i) \left[ \sum_{n=j}^{N} \bar{z}_{N-n+j}(i) \cdot e_n(i) \right]_{j=1\ldots N}$$

$$\hat{\phi}(i+1) = \hat{\phi}(i) + \Delta_\phi(i) I_m \left[ \sum_{n=1}^{N} e_n^*(i) \cdot \hat{x}_n(i) \right] \tag{5}$$

$$\hat{\tau}(i+1) = \hat{\tau}(i) + \Delta_\tau(i) Re \left[ \sum_{n=1}^{N} e_n^*(i) \cdot \frac{d\hat{x}_n(i)}{d\hat{\tau}} \right] \tag{6}$$

In the foregoing equations:
$e'(i)$ is an error signal expressed by $$e'(i) = z(i) - G(i) \cdot x(i); \tag{7}$$

$x^*(i)$ is the conjugated complex of vector $x(i)$;
$zj(i)$ is the conjugated complex of an updating signal $\bar{z}_j(i)$ given by $$\bar{z}_j(i) = z(i-N+j) - G \cdot F\hat{x}(i-N+j-1); \tag{8}$$

$e_n(i)$ is an error signal given by $$e_n(i) = x_n(i) - \hat{x}_n(i); \tag{9}$$

$e^*_n(i)$ is the conjugated complex of error signal $e_n(i)$;
Im denotes the imaginary part of the quantity appearing between brackets in equation (5);

Re denotes the real part of the quantity appearing between brackets in equation (6).

The operators $\Delta_G(i)$, $\Delta_K(i)$, $\Delta_\zeta(i)$ and $\Delta_\tau(i)$ designate iterative components of signals $\hat{G}$, $\hat{K}$, $\hat{\zeta}$ and $\hat{\tau}$ fed back via the several loops already referred to.

As further shown in FIG. 2, times base BT also has an output TK carrying a switchover signal for changing from an acquisition phase to an operating phase. This signal TK is fed to several electronic switches S1, S2, S3, S4 and S5. Clock signal CK times the operations of the various components of receiver R in a manner not illustrated in detail.

Demodulator DM has a pair of output leads forming part of a conductor multiple 3 which is intermittently connected via sampling gate C1 to the input 7 of equalizer EQ1 designed as a similar two-lead multiple; this equalizer, therefore, has two identical halves each conforming to the arrangement shown in our cited article (FIG. 9). The conductor carrying both the in-phase and the quadrature signal has a branch 3' leading to a differentiator DR whose output lead 5 is intermittently connected by sampling gate C2 to the input lead 8 of equalizer EQ2. The pulse trains reaching the two equalizers from sampling gates C1 and C2 are the signal $z$, given in equation (1), and its time differential $dz/d\hat{\tau}$, respectively. (For simplicity's sake, only the in-phase component issuing from demodulator DM will be considered).

Switches S1, S2, S3 and S4 are part of four selective delay networks including respective delay lines L1, L2, L3 and L4. Each of these switches has two inputs I and II; input I is connected directly to a respective supply lead 15, 11, 12, 7' whereas input II is connected to that lead via an associated delay line. Under the control of timing signal TK, an output lead 4, 20, 12 or 22 is connected to input I during the acquisition phase and to input II during the operating phase; in the acquisition phase, therefore, the delay line is bypassed and functionless. The purpose of the delay introduced in the operating phase is to compensate for the time required by equalizer EQ1 in processing the raw data pulses $z$ to produce an optimized output signal $\hat{I}$ on a line 16 which is connected to line 17 by way of a quantizer Q; the binary code representing the quantized signal $\hat{I}$, fed to the load of the receiver, has been designated $\check{I}$ and is also transmitted via a branch lead 17' of line 17 to an input II of switch S5. A local signal generator GE, working into the alternate input I of switch S5, produces test codes which may be called out from a read-only memory to establish the initial circuit parameters during the acquisition phase as described in our prior U.S. Pat. No. 3,978,435; generator GE is disconnected and therefore functionless in the operating phase in which an output lead 18 of switch S5 is connected by timing signal TK to input II rather than input I.

Connections 9 and 10 are conductor multiples carrying the respective components $\hat{g}_1 - \hat{g}_N$ and $\hat{k}_1 - \hat{k}_N$ of the optimized parameters $\hat{G}$ and $\hat{K}$.

The input lead 15 of delay network S1, L1 carries the updating signal $\bar{z}$ defined in equation (8); this signal may be obtained from the lead designated 2 in our prior U.S. Pat. No. 3,984,789. Input lead 11 of delay network S2, L2 carries the reference signal $\hat{x}$, defined in equation (2); signal $\hat{x}$ may be obtained from the lead designated 3 in that prior patent. Input lead 24 of network S3, L3 carries the optimized differential signal $d\hat{x}/d\hat{\tau}$ issuing from equalizer EQ2. Input lead 7' of delay network S4, L4 carries the raw data pulses $z$ appearing in the output 7 of sampling gate C1.

Each of these delay networks forms part of a respective feedback loop including a cumulative multiplier M1, M2, M3 or M4. Multiplier M1, delivering the optimized gain coefficient $\hat{K}$ via line 10 to equalizers EQ1 and EQ2, receives the updating signal $\bar{z}$ from switch S1 via lead 4, a shift register RG1 and a connection 14. Multiplier M2 receives reference signal $\hat{x}$ from switch S2 by way of lead 20 and generates the optimized phase signal $\hat{\zeta}$ controlling the operation of demodulator DM to which it is fed via lead 2. Multiplier M3 receives from switch S3, via lead 12, the optimized differential signal $d\hat{x}/d\hat{\tau}$ and generates the optimized timing signal $\hat{\tau}$ controlling, by way of lead 6, the operation of sampling gates C1 and C2. Each of these three multipliers is also supplied via a lead 13 with error signal $e_n$, as per equation (9), from a logical adder or summing circuit $\Sigma 1$ with a subtractive input connected to lead 20 and an additive input connected to an output lead 19 of a shift register RG2 which receives either the test code from generator GE (during the acquisition phase) of the output code $\check{I}$ from line 17 (in the operating phase) via output lead 18 of switch S5. Leads 13 and 18, like others herein referred to, will be understood to be also conductor multiples.

The fourth feedback loop includes, besides cumulative multiplier M4, an ordinary multiplier MM receiving over a branch 19' of line 19, during the operating phase, the output signal $\check{I}$ after a delay introduced by shift register RG2, this delay corresponding to a period of N clock cycles during which raw data pulses are stored in equalizers EQ1 and EQ2. Lead 9, which represents the output of multiplier MM, also extends to multiplier M4 together with branch 19'. The latter multiplier generates a complex signal $\hat{G} \cdot x$, representing the subtrahend in equation (7), on a lead 21 extending to a subtractive input of a summing circuit $\Sigma 2$. The minuend of that equation, i.e. the signal $z$, is fed to an additive input of summing circuit $\Sigma 2$ by the output lead 22 of switch S4. Thus, the logical adder $\Sigma 2$ produces on an output lead 23 thereof the error signal $e'$ of equation (7) and delivers it to multiplier MM.

OPERATION

During the acquisition phase, with switches S1 - S5 all standing on their inputs I, the two error signals $e_n$ and $e'$ are developed on the basis of the locally generated test codes. Delay lines L1 - L4 are ineffectual during that phase. Otherwise, the several circuit components function identically in both the acquisition and operating phases wherefore we shall limit the following description to the latter phase.

The incoming signal on line 1 is phase-demodulated in unit DM under the control of signal $\hat{\zeta}(i)$ appearing on lead 2. The resulting base-band signal is fed to differentiator DR in parallel with sampling gate C1, the output of the differentiator being concurrently sampled in gate C2 under the control of signal $\tau(i)$ on lead 6. The sampling instants $t$ may be expressed by $t = iT + \hat{\tau}(i)$ where $1/T$ is the signal-transmission rate. The resulting signal $z(i)$ on line 7 travels to the output 17 over what may be considered the main signal path (as distinct from the various feedback loops) including the equalizer EQ1 and the quantizer Q.

Output lead 16 of equalizer EQ1 carries the optimized signal $\hat{I}(i - N + 1)$ which is converted by quantizer Q into the outgoing signal $\check{I}(i - N + 1)$.

The optimized channel coefficient $\hat{G}(i+1)$ is produced, in conformity with equation (3), by the feedback loop which includes delay network S4, L4, summing circuit Σ2 and multipliers M4, MM. The output of cumulative multiplier M4 has the form $\hat{G}(i)\cdot x(i)$ where $x$ corresponds to the optimized signal I during the operating phase. Multiplier MM forms the product of error signal $e'(i)$ and signal $x(i)$ to which it adds the gain coefficient $\hat{G}(i)$ preserved from the preceding cycle.

Components $\hat{k}_j(i+1)$ of optimized gain coefficient $K(i+1)$ are provided by the feedback loop comprising delay network S1, L1, shift register RG1 and multiplier M1. This loop operates in conformity with equation (4) by utilizing the updating signal $\tilde{z}_{N-n+j}(i)$, available on lead 15, together with error signal $e_n(i)$ present on lead 13.

Phase signal $\hat{\zeta}(i+1)$ is delivered by the feedback loop comprising delay network S2, L2 and multiplier M2. This loop implements equation (5) by using the reference signal $\hat{x}(i)$, present on lead 20, together with error signal $e_n(i)$ on lead 13.

Timing signal $\hat{\tau}(i+1)$ is created by the feedback loop including delay network S3, L3 and multiplier M3. This is done in conformity with equation (6) on the basis of the optimized differential signal $d\hat{x}_n(i)/d\hat{\tau}$, issuing from equalizer EQ2 by way of lead 12, and the error signal $e_n(i)$ on lead 13. Multipliers M1, M2 and M3 store the respective signals $\hat{k}_j(i)$, $\hat{\zeta}(i)$ and $\hat{\tau}(i)$ from the preceding cycle which are to be added to their multiplication products in conformity with equations (4), (5) and (6).

Multiplier M2, which generates the optimized phase signal $\hat{\zeta}$, may comprise a phase corrector of the type disclosed in commonly owned application Ser. No. 752,168 filed Dec. 20 1976 by Renato Dogliotti et al. According to the disclosure of that application, a signal obtained from the quadrature channel in the output of an equalizer such as component EQ1 is digitally multiplied with the sign bit of a binary error signal such as the signal $e_n$ appearing on lead 13, the result being averaged over a number of clock cycles.

The following literature is referred to regarding cumulative multipliers M1 - M4: An article by L. Dadda, entitled "On Parallel Digital Multipliers", published October 1976 in ALTA FREQUENZA Vol. XIV, No. 10, and an article by L. Dadda and D. Ferrari, entitled "Digital Multipliers: A Unified Approach", published November 1968 in ALTA FREQUENZA Vol. XXXVII, No. 11.

We claim:

1. A method for recovering digital signals from an incoming data flow modulated on a phase-modulated carrier which is received over a transmission channel, comprising the steps of: p1 demodulating said carrier under the control of a locally generated phase signal to recover said data flow;

periodically sampling said data flow under the control of a locally generated timing signal to produce a train of raw data pulses;

optimizing said raw data pulses by recursive filtering over a multiplicity of sampling cycles under the control of adaptive parameters including a gain coefficient and a channel coefficient;

quantizing the optimized data pulses;

synthesizing a reference signal from the vector sum of said raw data pulses weighted by said channel coefficient over said multiplicity of sampling cycles;

storing the quantized data pulses for a period corresponding to said multiplicity of sampling cycles;

differentially combining the stored data pulses with said reference signal to produce an error signal;

synthesizing an updating signal from the vector sum of the differences between said raw data pulses and said reference signal obtained over said multiplicity of sampling cycles;

continuously optimizing said phase signal under the joint control of said error and reference signals;

continuously optimizing said gain coefficient under the joint control of said error and updating signals; and continuously optimizing said channel coefficient under the joint control of said raw and stored data pulses.

2. A method of recovering digital signals from an incoming data flow, received over a transmission channel, comprising the steps of:

differentiating the incoming data flow to obtain its derivative with respect to time;

periodically sampling said data flow and said derivative under the control of a locally generated timing signal to produce trains of raw data pulses and raw differential pulses;

optimizing said raw and differential data pulses in parallel by recursive filtering over a multiplicity of sampling cycles under the control of adaptive parameters including a gain coefficient and a channel coefficient;

quantizing the optimized data pulses;

synthesizing a reference signal from the vector sum of said raw data pulses weighted by said channel coefficient over said multiplicity of sampling cycles;

storing the quantized data pulses for a period corresponding to said multiplicity of sampling cycles;

differentially combining the stored data pulses with said reference signal to produce an error signal;

synthesizing an updating signal from the vector sum of the differences between said raw data pulses and said reference signal obtained over said multiplicity of sampling cycles;

continuously optimizing said timing signal under the joint control of said error signal and the optimized differential pulses;

continuously optimizing said gain coefficient under the joint control of said error and updating signals; and continuously optimizing said channel coefficient under the joint control of said raw and stored data pulses.

3. A method as defined in claim 2 wherein said incoming data flow is demodulated, under the control of a locally generated phase signal, from a phase-modulated carrier arriving over said transmission channel, comprising the further step of continuously optimizing said phase signal under the joint control of said error signal and said reference signal.

4. A receiver for an incoming data flow phase-modulated on a carrier arriving over a transmission channel, comprising:

demodulating means connected to said channel for recovering said data flow;

sampling means connected to said demodulating means for producing a train of raw data pulses under the control of a locally generated timing signal;

equalizing means connected to said sampling means for optimizing said raw data pulses by recursive filtering over a multiplicity of sampling cycles under the control of adaptive parameters including a gain coefficient and a channel coefficient, said equalizing means having a first output emitting the optimized data pulses, a second output emitting a reference signal internally synthesized from the vector sum of said raw data pulses weighted by said channel coefficient over said multiplicity of sampling cycles, and a third output emitting an updating signal internally synthesized from the vector sum of the differences between said raw data pulses and said reference signal obtained over said multiplicity of sampling cycles;

quantizing means connected to said first output for converting said optimized data pulses into outgoing data pulses;

storage means connected to said quantizing means for preserving said outgoing data pulses for a period corresponding to said multiplicity of sampling cycles;

adder means connected to said storage means and to said second output for differentially combining the preserved data pulses with said reference signal to produce an error signal;

a first feedback loop with input connections to said adder means and to said second output for delivering to a control input of said demodulating means an optimized phase signal derived from said error and reference signals;

a second feedback loop with input connections to said adder means and to said third output for delivering to said equalizing means an optimizing gain coefficient derived from said error and updating signals; and a third feedback loop with input connections to said sampling means and to said storage means for delivering to said equalizing means an optimized channel coefficient derived from said raw and stored data pulses.

5. A receiver as claimed in claim 4 wherein said third feedback loop comprises summing means in the input connection thereof extending to said sampling means, a cumulative multiplier working into said summing means, and a noncumulative multiplier with inputs tied to said summing means and to the input connection extending to said storage means for generating said optimizedchannel coefficient, said cumulative multiplier having inputs tied to the last-mentioned input connection and to the output of said noncumulative multiplier.

6. A receiver for an incoming data flow arriving over a transmission channel, comprising:

input means for recovering digital signals from said data flow;

differentiation means connected to said input means for obtaining the derivative of said digital signals with respect to time;

first and second sampling means respectively connected to said input means and to said differentiation means for producing a train of raw data pulses and a train of raw differential pulses;

first and second equalizing means respectively connected to said first and second sampling means for optimizing said raw data pulses and said raw differential pulses over a multiplicity of sampling cycles under the control of adaptive parameters including a gain coefficient and a channel coefficient, said first equalizing means having a first output emitting the optimized data pulses, a second output emitting a reference signal internally synthesized from the vector sum of said raw data pulses weighted by said channel coefficient over said multiplicity of sampling cycles, and a third output emitting an updating signal internally synthesized from the vector sum of the differences between said raw data pulses and said reference signal obtained over said multiplicity of sampling cycles;

quantizing means connected to said first output for converting said optimized data pulses into outgoing data pulses;

storage means connected to said quantizing means for preserving said outgoing data pulses for a period corresponding to said multiplicity of sampling cycles;

adder means connected to said storage means and to said second output for differentially combining the preserved data pulses with said reference signal to produce an error signal;

a first feedback loop with input connections to said adder means and to said third output for delivering to said first and second equalizing means an optimized gain coefficient derived from said error and updating signals;

a second feedback loop with input connections to said first sampling means and to said storage means for delivering to said first and second equalizing means an optimized channel coefficient derived from said raw and stored data pulses; and a third feedback loop with input connections to said adder means and to said second equalizer means for delivering to said first and second sampling means an optimized timing signal derived from said error signal and from the optimized differential pulses.

7. A receiver as defined in claim 6 wherein said input means includes a demodulator for recovering said digital signals from an incoming carrier phase-modulated therewith, further comprising a fourth feedback loop with input connections to said adder means and to said second output for delivering to a control input of said demodulator an optimized phase signal derived from said error and reference signals.

8. A receiver as defined in claim 7 wherein each of said feedback loops comprises a cumulative multiplier.

9. A receiver as defined in claim 7, further comprising a local test-signal generator and switchover means effective during an acquisition phase, preceding an operating phase, to connect said local generator in lieu of said quantizing means to said storage means.

10. A receiver as defined in claim 9 wherein each of said feedback loops includes delay means in one of its input connections and switch means synchronized with said switchover means for bypassing said delay means in said acquisition phase.

* * * * *